(12) United States Patent
Behm

(10) Patent No.: US 10,905,278 B2
(45) Date of Patent: Feb. 2, 2021

(54) SYSTEM FOR PRECISE TEMPERATURE CONTROL OF LIQUIDS IN CONSUMER PRODUCTS

(76) Inventor: Joseph Behm, San Diego, CA (US)

( * ) Notice: Subject to any disclaimer, the term of this patent is extended or adjusted under 35 U.S.C. 154(b) by 919 days.

(21) Appl. No.: 13/825,460

(22) PCT Filed: Sep. 21, 2011

(86) PCT No.: PCT/US2011/001639
§ 371 (c)(1),
(2), (4) Date: Mar. 21, 2013

(87) PCT Pub. No.: WO2012/039772
PCT Pub. Date: Mar. 29, 2012

(65) Prior Publication Data
US 2013/0167730 A1    Jul. 4, 2013

Related U.S. Application Data

(60) Provisional application No. 61/403,838, filed on Sep. 21, 2010.

(51) Int. Cl.
    A47J 31/56    (2006.01)
    F24H 9/20     (2006.01)
    G05D 23/19    (2006.01)
    A47J 27/21    (2006.01)

(52) U.S. Cl.
    CPC ......... *A47J 31/56* (2013.01); *A47J 27/21083* (2013.01); *F24H 9/2014* (2013.01); *F24H 9/2021* (2013.01); *G05D 23/1919* (2013.01)

(58) Field of Classification Search
    USPC ................... 99/281; 219/442, 506
    See application file for complete search history.

(56) References Cited

U.S. PATENT DOCUMENTS

| 4,665,292 A | 5/1987 | Payne |
| 4,828,166 A * | 5/1989 | Wolf .................. G05D 23/1902 219/496 |
| 5,582,755 A | 12/1996 | Maher, Jr. et al. |
| 6,095,031 A * | 8/2000 | Warne .................. A47J 31/007 99/282 |
| 6,380,521 B1 * | 4/2002 | Fanzutti .................. A47J 27/62 219/481 |
| 7,455,867 B1 * | 11/2008 | Gutwein .................. A23F 5/243 426/433 |
| 2010/0204849 A1 * | 8/2010 | Steffes ..................... H02J 3/28 700/296 |

(Continued)

FOREIGN PATENT DOCUMENTS

| CN | 201119756 | 9/2008 |
| CN | 201398851 | 2/2010 |

(Continued)

*Primary Examiner* — Thien S Tran

(57) ABSTRACT

Systems to allow temperature control more precise and accurate than the current state of the art for consumer products that heat liquids such as, without limitation, coffee makers, tea makers, electric kettles and espresso machines. One feature of such systems may include the ability to calibrate the system with reference to a known temperature point. Another feature of such system may allow reduction in the rate of water heating to allow the temperature of the water to approach a target temperature in a gradual manner.

22 Claims, 2 Drawing Sheets

(56) References Cited

U.S. PATENT DOCUMENTS

2011/0067575 A1* 3/2011 Jimenez ............... A47J 31/005
　　　　　　　　　　　　　　　　　　　　　　　99/281

FOREIGN PATENT DOCUMENTS

| EP | 1522247 A2 | 4/2005 |
|---|---|---|
| WO | WO-01/56436 A2 | 8/2001 |
| WO | WO-02/29336 A1 | 4/2002 |
| WO | WO-02/053987 A2 | 7/2002 |
| WO | WO-04/071258 A2 | 8/2004 |
| WO | WO-2006/050856 A1 | 5/2006 |
| WO | WO-2007/134476 A1 | 11/2007 |
| WO | WO-08/155538 A2 | 12/2008 |

* cited by examiner

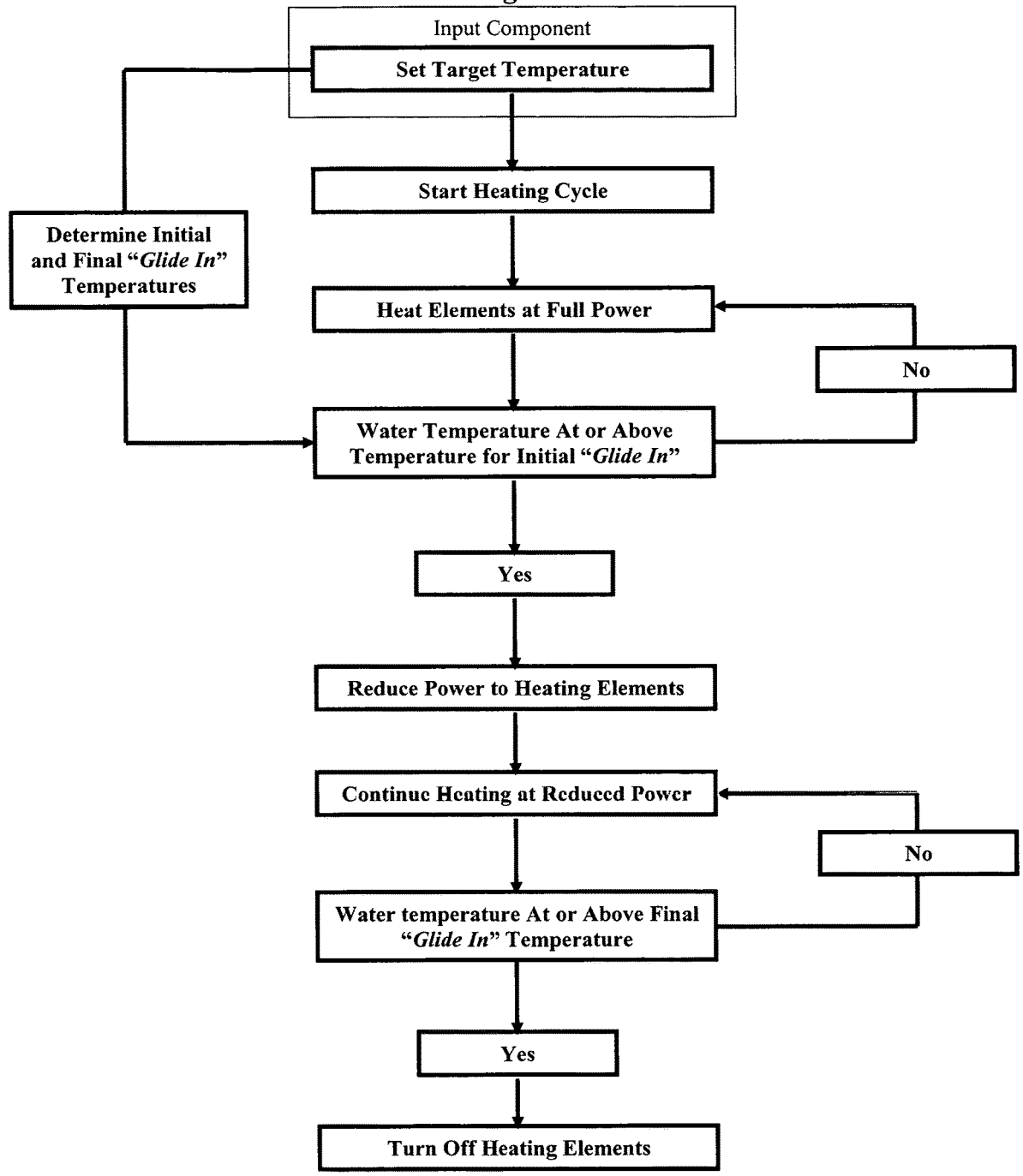

SYSTEM FOR PRECISE TEMPERATURE CONTROL OF LIQUIDS IN CONSUMER PRODUCTS

TECHNICAL FIELD

The present invention relates to systems for precisely and accurately controlling the temperature of liquids in consumer products.

BACKGROUND ART

Precise and accurate temperature control of liquids, such as water, in consumer products is desirable in a number of different contexts. For example, water temperature plays a critical role when brewing coffee or tea. In that context, water of different temperatures extracts different flavors, nuances and characteristics from the coffee or tea. Minor variations in the temperature of the water used in the brewing process can result in significant differences in the flavor profile of the resulting product. Consumers may favor the flavor profile produced by one water temperature over the flavor profile produced by a second water temperature.

More generally, when performing any liquid-based extraction from a substrate containing multiple compounds, varying the temperature of the liquid will vary the percentage of one or more of the extracted compounds in the final product of the extraction. Thus, it is advantageous to exercise precise and accurate control over the temperature of the liquid used in the extraction process.

Current mass-produced consumer products such as coffee makers, tea makers, electric kettles and the like have relatively poor temperature control. Variances in component parts such as thermal probes, thermisters and similar measurement devices and a lack of attention to precise and accurate temperature control in the design of such products result in substantial temperature variations. For example, it is believed that one of the leading consumer coffee makers that touts its brewing water temperature as a feature that distinguishes it from its competitors produces water that may be as much as 5° F. above or below the target temperature resulting in a total variation of up to 10° F. It is believed that one of the leading consumer electric kettles that allows a user to select a target temperature produces water that may be as much as 6° F. above or below the target temperature resulting in a total temperature variation of up to 12° F.

Accordingly, there remains a need for systems that allow more precise and accurate temperature control when heating liquids in consumer products.

DISCLOSURE OF INVENTION

The present invention presents a system that allows for more precise and accurate temperature control when heating liquids in consumer products as compared with the current state of the art. The system may be used to produce liquid of a target temperature that is selected and set for the product before the product is offered to consumers or the system may be used to produce liquid of a target temperature that is selected by the consumer.

The system may be implemented in any consumer product that has a component for containing water or other liquid, a component for heating the liquid, a component for determining the temperature of the liquid and a component for controlling the heating component in response to input. Examples of the types of products in which implementing the system may prove beneficial are, without intent to limit the scope of the invention, coffee makers, tea makers, electric kettles and espresso makers.

The component for heating the liquid may be any such component known in the art such as a heating element in direct contact with the liquid, indirect heating or any other method of heating known in the art. The component for controlling the heating component may be any such component known in the art such as hardware, software, firmware, a combination of some or all of the foregoing or any other such component known in the art. The control component may also be an external computing device such as a personal computer, a "smart phone," tablet computing device, or any other suitable device. If the control component is such an external computing device, communication between the control component and the other components of the system may be accomplished through any means known in the art such as direct connection through universal serial bus ports or through wireless communication. The component for determining the temperature of the liquid may be any such component known in the art that communicates a signal representative of a sensed temperature. The control component is operatively connected to the heating component and temperature sensing component. Examples of products that include the forgoing components include, without limitation, coffee makers, tea makers and kettles.

The system may include a calibration feature. The calibration feature accounts for the variations inherent in components intended for consumer products. The calibration feature comprises, selecting a known temperature, filling the product with a sufficient amount of liquid, heating or cooling the liquid to the selected temperature and indicating to the control component that the temperature has been achieved. The control component will then determine future temperatures with reference to the calibration temperature. The calibration feature may be performed once or in multiple instances over time. It may be performed at any point in the distribution process such as by the factory, wholesaler, retailer or consumer or it may be performed at multiple points in the distribution process. The calibration feature may be automatically performed upon initial activation of the heating system.

One embodiment of the calibration feature may involve filling the appliance with water, heating the water until it has boiled for a specified period of time and then indicating to the control mechanism that the measured temperature is the boiling point of water. The indication to the control mechanism may be a manual input such as one or more switches, buttons or any other manual input known in the art or it may be one or more automatic sensors such as one that detects steam, resistance value or any other automatic sensors known in the art and capable of determining that water is boiling. The calibration feature may account for the variation in the boiling temperature of water due to variation in ambient air pressure or altitude or it may not. If so, such a feature may allow manual input of the altitude or ambient air pressure or the ambient air pressure or altitude may be detected automatically through any means known in the art.

The precise and accurate temperature control system may include a "glide in" feature. The "glide in" feature minimizes or prevents heating the liquid in excess of the target temperature. Excessive heating occurs due to little or no control over the rate of heating the liquid. The "glide in" feature works in combination with the temperature sensing component, the control component and the heating component. The fundamental concept of the "glide in" feature is that the rate of liquid heating is slowed as the target temperature is approached to facilitate a gentle "glide in" to the target temperature. The heating of the liquid may be slowed by reducing the amount of energy supplied to the heating component, cycling the heating component from an active to inactive state, some combination of the foregoing or any other means known in the art for reducing the rate of heating of the liquid. Such control of the heating component is performed by the control component with reference to the target temperature and input from the temperature sensing component. The monitoring of the temperature sensing component may be constant or intermittent over time. The adjustment of the rate of heating the liquid may be constant, intermittent over time or based on the liquid reaching one or more designated temperatures. The temperature at which the rate of heating the liquid is reduced is defined herein as the "Initial Glide In Temperature." The temperature at which the heating elements are turned off just before the liquid reaches the target temperature is defined as the "Final Glide In Temperature."

It is generally preferable to keep the heating elements at full power for as long as possible in order to reduce the total time needed to reach the target temperature. It will be appreciated, however, that in addition to the amount of power being supplied to the heating element, other factors will also affect the rate at which the temperature of the liquid increases. Thus, the Initial and Final Glide In Temperatures may vary based on a number of factors. For example, such temperature rise will be greater in a smaller amount of liquid than a larger amount of liquid. Accordingly, the "glide in" feature may account for such different heating rates by using the amount of liquid in the reservoir as an additional input to the control component and modifying the Initial and Final Glide In Temperatures accordingly. The input to the control component for the amount of liquid may be specified manually through a keypad or any other means known in the art or it may be sensed automatically by a liquid level sensor or any other means known in the art. In addition, such temperature rise will be greater if the heating element is has a large capacity for storing heat than a small capacity. The capacity of the heating element to store heat, and therefore the propensity of the heating element to continue heating after the power to the heating element is reduced or turned off, may be accounted for in the programming of the control component or by any other means known in the art. The control component may adjust the Initial and Final Glide In Temperatures accordingly.

BRIEF DESCRIPTION OF THE DRAWINGS

FIG. 2 is a flow chart showing the operation of a preferred embodiment of the "glide in" feature of the invention

BEST MODE FOR CARRYING OUT THE INVENTION AND INDUSTRIAL APPLICABILITY

Figure 1:
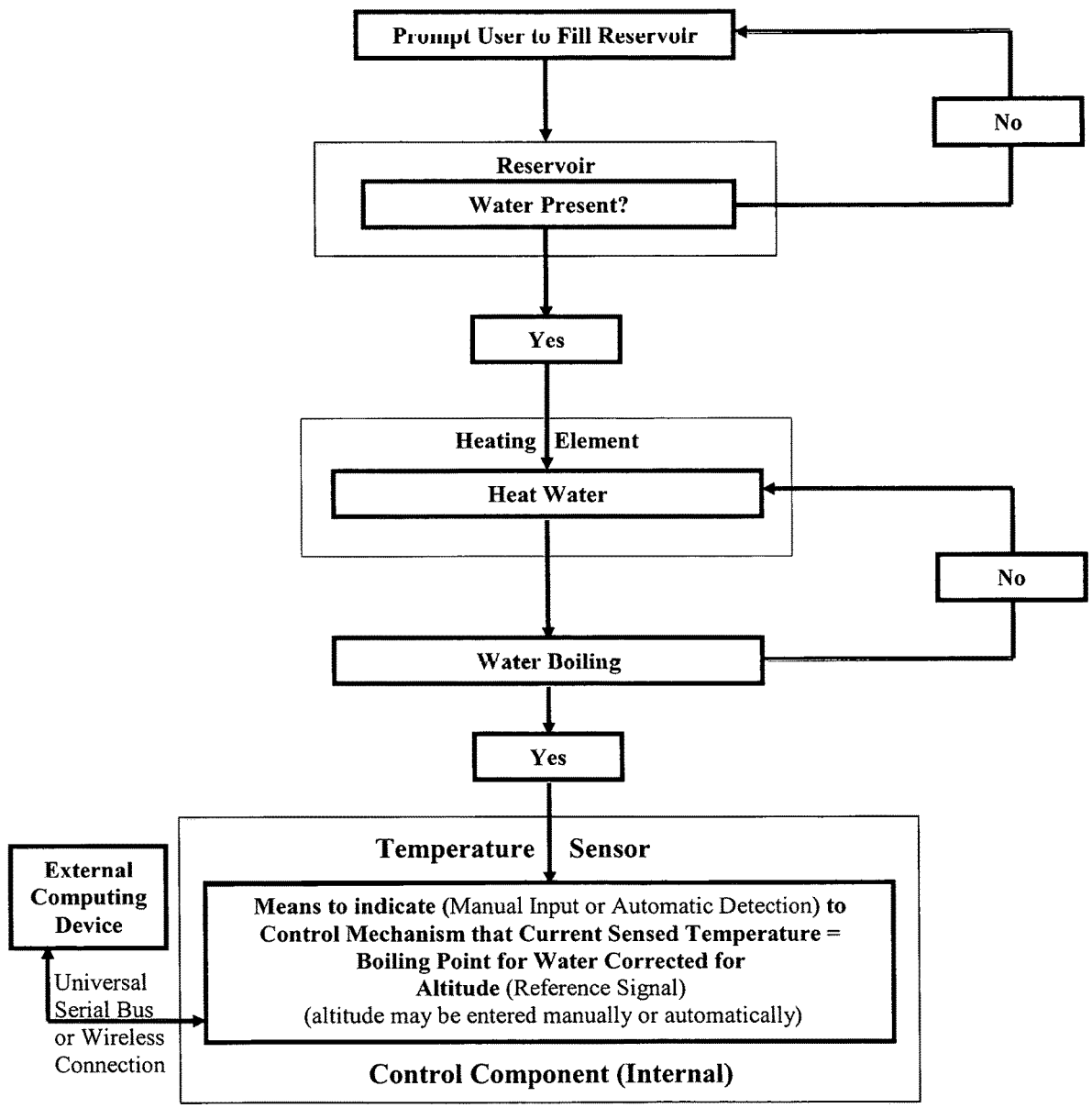
FIG. 1 is a flow chart showing the operation of a preferred embodiment of the calibration feature of the invention

The following description relates only to a preferred embodiment of the invention and is not intended to limit the scope of the invention in any way. In a preferred embodiment, the system is implemented in a coffee maker. In normal operation, the appropriate portions of the coffee maker are filled with water and ground coffee and the user either starts the brewing process with a manual input or programs the coffee maker to begin brewing at a specified time. The control module comprises one or more programmable microcontrollers or similar devices known in the art with suitable programming. The coffee maker allows the user to specify a target temperature for the brewing water and includes the calibration and the "glide in" features allowing the coffee maker to produce brewing water in a much more precise and accurate temperature range than the current state of the art.

The calibration feature is implemented by the user filling the water reservoir with an appropriate amount of water and giving a manual input to the control component indicating that a calibration cycle is to be performed. It is desirable that the input indicating a calibration cycle be generated by an act which a user is unlikely to perform accidentally. For example, the user may simultaneously depress two buttons or enter a specific code on a keypad that produces the relevant signal. Upon initiation of a calibration cycle, the control unit causes the heating component to heat the water as quickly as possible. Once the water has reached a full boil, the user gives a second manual input that generates a signal to the control component indicating that the water is at full boil. Alternatively, the coffee maker may be supplied with a sensor that automatically detects when the water is at full boil. The control component then records or otherwise notes that the current signal it is receiving from the temperature sensing component corresponds to the boiling point of water and calibrates itself to compare all future signals with reference to the recorded signal. Preferably, the control component then causes the water to be transferred from the reservoir, through the basket for holding coffee grounds and into the carafe or other vessel for holding brewed coffee. Such "flushing" of the system can assist in initial and subsequent cleaning of the water path through the coffee maker.

The "glide in" feature is implemented by the control component monitoring the signal from the temperature sensing component, comparing that signal with the reference established during the calibration cycle and the target temperature input by the user. Once the current temperature of the water reaches the Initial Glide In Temperature, the control component reduces the power supplied to the heating component. The Initial Glide In Temperature is determined by the control component with reference to the amount of water in the reservoir and the capacity of the heating elements for retaining heat. This process may be repeated numerous times as the target temperature is approached or it may be a continuous or near-continuous reduction of power. In a preferred embodiment, the power supplied to the heating element varies between 1,400 Watts and 400 Watts during the course of heating the water.

Once the water reaches the Final Glide In Temperature, the power to the heating elements is completely shut off allowing the water to "glide in" to the target temperature. The Final Glide In Temperature is determined by the control component with reference to the amount of water in the reservoir and the capacity of the heating elements for retaining heat. Once the water has reached the target temperature, the water is released onto the coffee grounds in the basket and drained into the carafe. The temperature of the water remaining in the reservoir during the transfer from the reservoir to the basket is monitored and the "glide in" process may be repeated numerous times to keep such remaining water at the target temperature. Keeping the water at the target temperature may involve a continuous or near-continuous reduction of power until all water has been dispensed.

The invention claimed is:

1. A system for improving the precise and accurate temperature control of a water healing consumer appliance comprising:
    a reservoir for holding a liquid;
    at least one heating element located to heat said liquid;
    at least one temperature sensor that generates a signal representative of a sensed temperature located to sense a temperature of said liquid;
    at least one control component;
    said at least one control component connected to said at least one temperature sensor to receive said signal;
    means to indicate to said at least one control component that a first signal represents a reference signal equal to a boiling temperature of said liquid corrected for altitude;
    at least one input component for a user to input a target liquid temperature;
    said at least one control component connected to said at least one input component to receive said target liquid temperature; and
    said at least one control component being capable of comparing future signals from said at least one temperature sensor with said reference signal and said target liquid temperature to precisely and accurately produce liquid of the target liquid temperature.

2. The system of claim 1 in which the means to indicate to said at least one control component that said signal represents a reference signal comprises a manual input that must be activated by a user of the system.

3. The system of claim 1 in which the means to indicate to said at least one control component that said signal represents a reference signal comprises means for automatically detecting that said liquid is boiling.

4. The system of claim 1, in which said at least one control component is an external computing device.

5. The system of claim 4 in which said external computing device includes a personal computer, a smart phone, a tablet computing device or any other suitable device.

6. The system of claim 4 in which said external computing device communicates with other components of the system through direct connection through universal serial bus ports or through wireless communication.

7. The system of claim 5 in which said external computing device communicates with other components of the system through direct connection through universal serial bus ports or through wireless communication.

8. A system for improving the precise and accurate temperature control of a water heating consumer appliance comprising:
    a reservoir for holding a liquid;
    at least one heating element located to heat said liquid;
    at least one temperature sensor that generates a signal representative of a sensed temperature located to sense a temperature of said liquid;
    at least one control component;
    said at least one control component connected to said at least one temperature sensor to receive said signal;
    means to indicate to said at least one control component that a first signal represents a reference signal equal to a boiling temperature of said liquid corrected for altitude;
    at least one input component for a user to input a target liquid temperature;
    said at least one control component connected to said at least one input component to receive said target liquid temperature;
    said at least one control component being capable of comparing future signals from said at least one temperature sensor with said reference signal and said target liquid temperature to precisely and accurately produce liquid of the target liquid temperature;
    said at least one control component connected to said at least one heating element to control a rate at which said at least one heating element heats said liquid; and
    said at least one control component interacting with said at least one heating element to reduce the rate at which a liquid is heated as said signal approaches a predetermined level indicative of said target liquid temperature.

9. The system of claim 8 in which the means to indicate to said at least one control component that said signal represents a reference signal comprises a manual input that must be activated by a user of the system.

10. The system of claim 8 in which the means to indicate to said at least one control component that said signal represents a reference signal comprises means for automatically detecting that said liquid is boiling.

11. The system of claim 8 in which said at least one control component is an external computing device.

12. The system of claim 11 in which said external computing device includes a personal computer, a smart phone, a tablet computing device or any other suitable device.

13. The system of claim 11 in which said external computing device communicates with other components of the system through direct connection through universal serial bus ports or through wireless communication.

14. The system of claim 12 in which said external computing device communicates with other components of the system through direct connection through universal serial bus ports or through wireless communication.

15. The system of claim 1 in which the system corrects for altitude by a manual input from a user of the system.

16. The system of claim 1 in which the system automatically corrects for altitude.

17. The system of claim 1 in which said consumer appliance comprises an electric kettle.

18. The system of claim 1 in which said consumer appliance comprises a coffee maker.

19. The system of claim 8 in which the system corrects for altitude by a manual input from a user of the system.

20. The system of claim 8 in which the system automatically corrects for altitude.

21. The system of claim 8 in which said consumer appliance comprises a coffee maker.

22. The system of claim 8 in which said consumer appliance comprises an electric kettle.

* * * * *